(12) United States Patent
Uesugi et al.

(10) Patent No.: US 7,976,918 B2
(45) Date of Patent: Jul. 12, 2011

(54) BIAXIALLY DRAWN, BLOW-MOLDED BOTTLE AND ITS PREFORM

(75) Inventors: Daisuke Uesugi, Matsudo (JP); Akio Hashimoto, Isehara (JP); Masato Suzuki, Isehara (JP); Hiromi Shimura, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 614 days.

(21) Appl. No.: 10/497,784

(22) PCT Filed: Jan. 29, 2003

(86) PCT No.: PCT/JP03/00817
§ 371 (c)(1),
(2), (4) Date: Dec. 7, 2004

(87) PCT Pub. No.: WO03/064268
PCT Pub. Date: Aug. 7, 2003

(65) Prior Publication Data
US 2005/0139566 A1 Jun. 30, 2005

(30) Foreign Application Priority Data
Jan. 29, 2002 (JP) ................................. 2002-019866

(51) Int. Cl.
*B29D 23/00* (2006.01)
*A47J 41/02* (2006.01)

(52) U.S. Cl. ................ 428/35.7; 215/12.1; 215/12.2; 215/375; 428/34.1

(58) Field of Classification Search .............. 428/35.7, 428/34.1; 215/12.2, 12.1, 375
See application file for complete search history.

(56) References Cited

U.S. PATENT DOCUMENTS

| | | | | |
|---|---|---|---|---|
| 4,476,084 A | * | 10/1984 | Takada et al. | ............. 264/342 R |
| 4,535,901 A | * | 8/1985 | Okudaira et al. | ............. 215/12.2 |
| 4,572,811 A | | 2/1986 | Ota et al. | |
| 4,933,135 A | | 6/1990 | Horwege et al. | |
| 5,676,267 A | | 10/1997 | Slat et al. | |

(Continued)

FOREIGN PATENT DOCUMENTS

EP    1 029 664 A    8/2000

(Continued)

OTHER PUBLICATIONS

Office Action from U.S. Appl. No. 12/153,569; mailed Feb. 2, 2010.

(Continued)

*Primary Examiner* — Brent T O'Hern
(74) *Attorney, Agent, or Firm* — Oliff & Berridge, PLC

(57) ABSTRACT

A biaxially drawn, blow-molded bottle and its preform comprise at least a layer of a gas barrier material laminated inside the PET resin layers, a functional portion having a screw thread raised spirally in the upper portion of neck and also having a stop ring disposed under the screw thread, and a neck ring disposed at the lower end of the neck. In these preform and bottle, the leading edge of the gas barrier layer is positioned at a half height of the neck ring where the most advanced front of the leading edge neither reaches a half height of the stop ring nor extends to the functional portion. It is intended here that the neck would not be affected by the shrinking deformation caused by the existence of the gas barrier layer in the functional portion of the neck, which is treated for thermal crystallization.

4 Claims, 3 Drawing Sheets

U.S. PATENT DOCUMENTS

| | | | |
|---|---|---|---|
| 5,927,525 A * | 7/1999 | Darr et al. | 215/12.2 |
| 6,123,211 A | 9/2000 | Rashid et al. | |
| 2001/0030163 A1 | 10/2001 | Rashid et al. | |
| 2002/0192404 A1 * | 12/2002 | Swenson | 428/34.1 |
| 2003/0031814 A1 * | 2/2003 | Hutchinson et al. | 428/35.7 |
| 2005/0139566 A1 | 6/2005 | Uesugi et al. | |
| 2008/0251487 A1 | 10/2008 | Semersky et al. | |
| 2009/0230074 A1 | 9/2009 | Toyoda | |

FOREIGN PATENT DOCUMENTS

| | | |
|---|---|---|
| EP | 1 155 807 A | 11/2001 |
| JP | A 57-128516 | 8/1982 |
| JP | A 61-203332 | 9/1986 |
| JP | A 61-273927 | 12/1986 |
| JP | U 63-57210 | 4/1988 |
| JP | A 63-294342 | 12/1988 |
| JP | A 1-254539 | 10/1989 |
| JP | A 2001-150524 | 6/2001 |
| JP | A 2003-71911 | 3/2003 |
| WO | WO 98/46410 A | 10/1998 |
| WO | WO 01/34479 A | 5/2001 |
| WO | WO 01/34479 A1 * | 5/2001 |

OTHER PUBLICATIONS

Office Action from U.S. Appl. No. 12/153,569; mailed Jul. 21, 2010.

* cited by examiner

BIAXIALLY DRAWN, BLOW-MOLDED BOTTLE AND ITS PREFORM

TECHNICAL FIELD

This invention relates to a biaxially drawn, blow-molded bottle and its preform having a gas barrier layer laminated inside the wall.

Biaxially drawn, blow-molded bottles made of, e.g., a polyethylene terephthalate resin (hereinafter referred to as PET resin) have been trending toward a thinner and thinner wall in recent years, taking the cost aspect into consideration. In order for the drinks filled inside the bottle to be prevented from getting rotten, there is an ever-increasing request for a higher level of gas barrier property for the bottles with a thin wall.

The secondary molded products in the shape of bottles are given the gas barrier property in two ways to meet such a request. One method is to mold a primary molded product (hereinafter referred to as preform), which is molded into a bottle and has a laminated structure of PET resin/gas barrier material/PET resin. The other method is to injection-mold the preform, in which the PET resin is blended with such a gas barrier material as nylon (MXD-6) and to biaxially draw and blow-mold this preform into a bottle.

The preform of a laminated structure is molded by injecting the PET resin into the mold cavity through the nozzle of an injection-molding machine that has been adjusted to a predetermined injection pressure, then injecting a gas barrier material over the PET resin in the cavity through the nozzle of another injecting machine, and again injecting into the cavity the PET resin that has been adjusted to a predetermined injection pressure.

Because the gas barrier material does not come in contact with the inner mold wall owing to the existence of already injected PET resin, the gas barrier material keeps a less decreased temperature and remains highly flowable. Thus, the gas barrier material moves quickly between two PET layers, and forms a laminated structure of PET/gas barrier/PET.

The flowability of PET resin and gas barrier material inside the cavity changes depending on various factors, including the temperature of the injecting machine, injection pressure, injection speed, the difference in viscosity between the resin and the gas barrier material, the percentage of moisture in the resin, and manifold temperature. Especially, temperatures have a large effect. Even if set temperatures are specified for the injecting machines, it is difficult to control precisely the temperatures of the PET resin and the gas barrier material inside the injecting machines. The changes in such conditions as the injection pressure, the injection speed, and the temperature of the gas barrier material inevitably give rise to a delicate change in flowability. Because of this change, there occurs a phenomenon, in which a part of the leading edge or the flow front of the gas barrier layer moves toward the mouth from the set position on the circumference of the neck at the time of preform molding while the rest of the leading edge remains on the body side from the set position. Similarly, on the circumference of the body, too, a part of the trailing edge or the rear edge of the flow moves upward from the set position while the rest of the trailing edge remains on the bottom side of the set position.

The neck of the injection-molded preform is a portion that is not drawn in the secondary molding operation in which the preform is biaxially drawn and blow-molded into a bottle. This neck portion is thicker than any other portions, and has a full gas barrier property with no need of being provided with a gas barrier layer.

However, a problem arises here. If the preform has a laminated structure comprising PET resin layers and a gas barrier layer, and if the neck of the bottle molded from such preform is subjected to whitening (thermal crystallization), the whitening treatment makes the neck less shrinkable due to a difference in the degrees of shrinkage between the PET resin and the gas barrier material. As a result, the neck tends to have larger dimensions than the set values after the whitening treatment and to have an elliptic shape. Especially since the functional portion of the neck is not formed as specified, the screw engagement and the seal of the cap get out of order.

If the preform of a laminated structure comprising PET resin layers and a gas barrier layer is biaxially drawn and blow-molded into a bottle, there is a problem of damaged transparency and poor outer appearance, which occurs when the PET resin layers and the gas barrier layer peel off from each other at the bottom of the bottle due to the shock of a vertical load, such as the fall of the bottle.

This invention has been made to solve the above-described problems found in conventional art. The technical problem of this invention is to enable the functional portion of the neck to have the specified dimensions as precisely as possible in both of the biaxially drawn, blow-molded bottle and its preform having the gas barrier layer in the laminated structure, with a view to compensating for the gas barrier property of the blow-molded bottle. Thus, an object of this invention is to set the position of the leading edge of the gas barrier layer and thereby to solve the problem of changing dimensions of the neck after the whitening treatment. Another object of this invention is to solve the problem of damaged transparency and poor outer appearance, which occurs when the PET resin layers and the gas barrier layer peel off from each other at the bottom of the bottle due to the shock of a vertical load, such as the fall of the bottle. With this problem solved also by setting the position of the leading edge of the gas barrier layer, there can be obtained the biaxially drawn, blow-molded bottle, which can be used comfortably, and its preform to be used to mold such a bottle.

DISCLOSURE OF THE INVENTION

Among the Claims of this invention to solve the above-described problems, the means of carrying out the invention of Claim 1 exists in the configuration: that the biaxially drawn, blow-molded bottle comprises a neck having an upper portion and a lower end; at least a gas barrier layer laminated inside layers predominantly made of polyethylene terephthalate, and in addition, comprises a functional portion having a screw thread raised spirally in the upper portion of neck and also having a stop ring disposed under the screw thread and a neck ring disposed at the lower end of the neck, the neck ring disposed below the screw thread and the stop ring; that the leading edge of the gas barrier layer is disposed at a position of the neck where the most advanced front of the leading edge does not reach a vertically central portion of the stop ring; and that the neck is treated for thermal crystallization.

In this invention of Claim 1, the leading edge of the gas barrier layer is disposed at the neck position Where the most advanced front of the leading edge does not reach a half height of the stop ring of the neck. Even if the leading edge is somewhat displaced from the set position at the time of preform molding, the bottle of the laminated structure can be molded with no leading edge reaching the stop ring and the screw thread, which make up the functional portion of the neck.

Even if the leading edge is somewhat displaced from the set position at the time of preform molding, there exists no gas barrier layer in the stop ring and the screw thread that make up the functional portion of the neck. Therefore, after the whitening treatment of the neck, the heat resistant bottle does not have to face the problem of the neck that shrinks less and increases in dimensions, because the problem is caused by a difference in the degrees of shrinkage between the PET resin and the gas barrier material. Instead, the neck can be molded in the right dimensions as designed.

The means of carrying out the invention of Claim 2 includes the configuration of Claim 1 and also comprises that the leading edge of the gas barrier layer is disposed at the position of the neck where the most advanced front of the leading edge does not reach the functional portion of the neck.

In the invention of Claim 2, the leading edge of the gas barrier layer is disposed at the neck position where the most advanced front of the leading edge does not reach the functional portion of the neck. Thus, there is no gas barrier layer in the functional portion of the neck, which comprises the stop ring and the screw thread. This functional portion is varied in its length, depending on the type of bottles, including the bottle having a pilfer-proof function. Therefore in this invention, too, the heat resistant bottle does not have to face the problem of the neck that shrinks less and increases in dimensions, after the whitening treatment of the neck, because the problem is caused by a difference in the degrees of shrinkage between the PET resin and the gas barrier material. Instead, the neck can be molded in the right dimensions as designed after the whitening treatment.

The means of carrying out the invention of Claim 3 includes the configuration of the invention of Claim 1 or 2 and also comprises that the leading edge of the gas barrier layer is disposed at a position within a range of ±7 mm from a vertically central portion of the neck ring.

In the invention of Claim 3, the standardized preform has a height of 7 mm or more from a half height of the neck ring to a half height of the stop ring. The leading edge of the gas barrier layer has also a vertical width of displacement in the range of ±7 mm, which is observed when the preform is injection-molded. For these reasons, the leading edge of the gas barrier layer is set at the position of a half height of the neck ring. Thus, it is possible to mold the bottle of a laminated structure in which the most advanced front of the leading edge of the gas barrier layer neither extends to the functional portion nor reaches a half height of the stop ring, which is a part of the functional portion of the neck.

The means of carrying out the invention of Claim 4 exists in the configurations that the biaxially drawn, blow-molded bottle comprises at least a layer of the gas barrier material laminated with resin layers mainly made of polyethylene terephthalate and that the trailing edge of the gas barrier layer is set at the position near the lower end of the body where the trailing edge does not reach the bottom of the biaxially drawn, blow-molded bottle.

In the invention of Claim 4, the trailing edge of the gas barrier layer is set at the lower end of the body where this edge does not reach the bottom of the biaxially drawn, blow-molded bottle. Thus, there is no gas barrier layer at the bottom of the bottle.

Since there exists no gas barrier layer at the bottom of the bottle, the damaged transparency and poor outer appearance cannot be caused by the separation of the gas barrier layer from the PET resin layers at the bottom of the bottle even if the bottle experiences the shock of a vertical load, such as the fall of the bottle.

The means of carrying out the invention of Claim 5 includes the configuration of Claims 1 to 3, and also comprises that the trailing edge of the gas barrier layer is disposed in the lower portion of the body of the bottle where the trailing edge does not reach the bottom of the biaxially drawn, blow-molded bottle.

In the invention of Claim 5, the leading edge is set at the position where the most advanced front of the leading edge neither reaches a half height of the stop ring of the neck nor extends to the functional portion of the neck, and the trailing edge is set at the position where the trailing edge does not reach the bottom. Therefore, after the whitening treatment, the neck can be molded in the right dimensions as designed. In addition, even if the bottle experienced the shock of a vertical load, such as the fall of the bottle, the biaxially drawn, blow-molded bottle thus obtained would not have any damaged transparency and poor outer appearance.

The means of carrying out the invention of Claim 6 exists in the configuration: that the preform of a biaxially drawn, blow-molded bottle comprises a neck having an upper portion and a lower end; at least a layer of a gas barrier material laminated inside the layers predominantly made of polyethylene terephthalate, a functional portion having a screw thread raised spirally in the upper portion of the neck and also having a stop ring disposed under the screw thread, and a neck ring disposed at the lower end of the neck, the neck ring disposed below the screw thread and the stop ring, which is treated for thermal crystallization; and that the leading edge of the gas barrier layer is disposed at a vertically central portion of the neck ring or in the range where the most advanced front of the leading edge neither reaches a vertically central portion of the stop ring nor extends to the functional portion of the neck.

In the invention of Claim 6, the leading edge of the gas barrier layer is set at a half height of the neck ring at the stage of molding the preform or the primary molded product. When the preform is molded, the leading edge is positioned at a half height of the stop ring or in the range where the most advanced front of the leading edge neither reaches a half height of the stop ring nor extends to the functional portion of the neck, even if the most advanced front is somewhat displaced. The preform thus obtained has no gas barrier layer in the stop ring and the screw thread, which make up the functional portion of the neck.

Since there is no gas barrier layer in the functional portion of the neck, the neck can be molded precisely in the specified dimensions without causing any such inconvenience as the functional portion having larger dimensions than specified, after the whitening treatment of this preform.

The means of carrying out the invention of Claim 7 exists in the configurations:
that the preform of a biaxially drawn, blow-molded bottle comprises at least a layer of a gas barrier material laminated inside layers predominantly made of polyethylene terephthalate, and
that the trailing edge of the gas barrier layer is disposed in the lower portion of the body where the trailing edge does not reach the bottom of the bottle.

In the invention of Claim 7, the trailing edge of the gas barrier layer is set at the position where the trailing edge does not reach the bottom of the bottle already at the preform-molding stage. Therefore, even if the biaxially drawn, blow-molded bottle experiences the shock of a vertical load, such as the fall of the bottle, it is possible to obtain the preform to be molded into a bottle that is free from damaged transparency and poor outer appearance.

PREFERRED EMBODIMENT OF THE INVENTION

Figure 1:
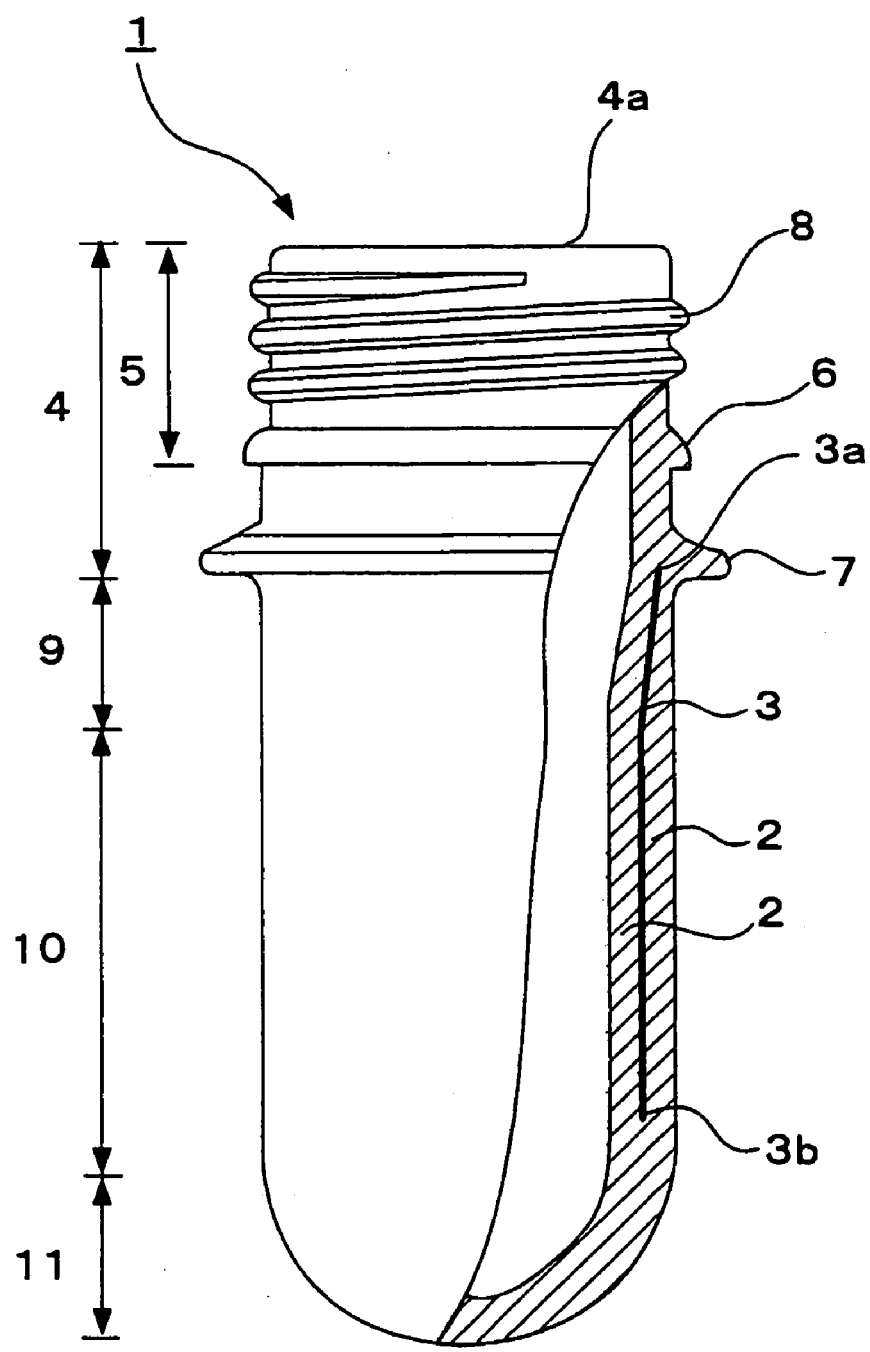
FIG. 1 is a front view, with a partial longitudinal section, showing the preform of this invention.

An embodiment of this invention is described, now referring to the drawings. FIG. 1 shows a front view, with a partial longitudinal section, of the entire preform 1, which is the primary molded product to be used to mold the biaxially drawn, blow-molded bottle. The preform 1 has a laminated structure comprising a PET resin layer 2—a gas barrier layer 3—a PET resin layer 2.

The gas barrier material used in this embodiment was a polyamide containing m-xylylene diamine (known under the trade name of MXD-6; Mitsubishi Gas Chemical), taking into consideration the gas barrier property, the difference in viscosity and the difference in the speed of crystallization between the gas barrier material and the PET resin.

As shown in FIG. 1, the preform 1 comprises a functional portion 5, which consists of the screw thread 8 raised on the outer wall in the upper portion of the neck 4 and the stop rings 6 circumferentially disposed on the outer wall below the screw thread 8, and also comprises a neck ring 7 disposed in the lower portion of the neck 4. As shown in FIG. 1, the neck ring 7 is disposed below the screw thread 8 and the stop ring 6. The neck 4 has an upper portion and a lower end.

Successively downward from the neck 4, the preform 1 comprises the cylindrical shoulder 9, the body 10, and the bottom 11. The bottom 11' of the bottle 1' is molded from this bottom 11, and includes a ground contact portion 11a', a curved area of the ground contact portion 11a' and a concave portion 11b'.

Preform 1 is molded in such a manner that the leading edge 3a, the upper end of the gas barrier layer 3, is set at a half height of the neck ring 7.

At the time when the preform is molded, the leading edge 3a of the gas barrier layer 3 may be somewhat displaced from the set position of a half height of the neck ring 7. To be more precise, the leading edge 3a shown in FIG. 1 could either be (1) the lowermost margin of wavy barrier layer edge, (2) the uppermost margin of wavy barrier layer edge or (3) any intermediate edge. When the most advanced front of the leading edge 3a (in the case (1)) does not reach a half height of the stop ring, the other front of the leading edge 3a (in the case (2) and (3)) is below the most advanced front of the leading edge. Therefore, all fronts of the leading edge are below a half height of the stop ring. Even if such displacement occurs, the most advanced front of the leading edge 3a does not reach a half height of the stop ring 6 of the neck 4, but can be positioned within ±7 mm from a half height of the neck ring 7.

If the stop ring 6 has a small height as shown in FIG. 1, the most advanced front of the leading edge 3a does not reach a half height of the stop ring 6 even if the leading edge 3a has been displaced. Therefore, the preform 1 that can be molded has no gas barrier layer in the functional portion 5, which comprises the stop ring 6 and the screw thread 8.

The preform 1 is molded in such a way that the trailing edge 3b, the lowest end of the gas barrier layer 3, is disposed in the lower portion of the body 10.

Figure 3:
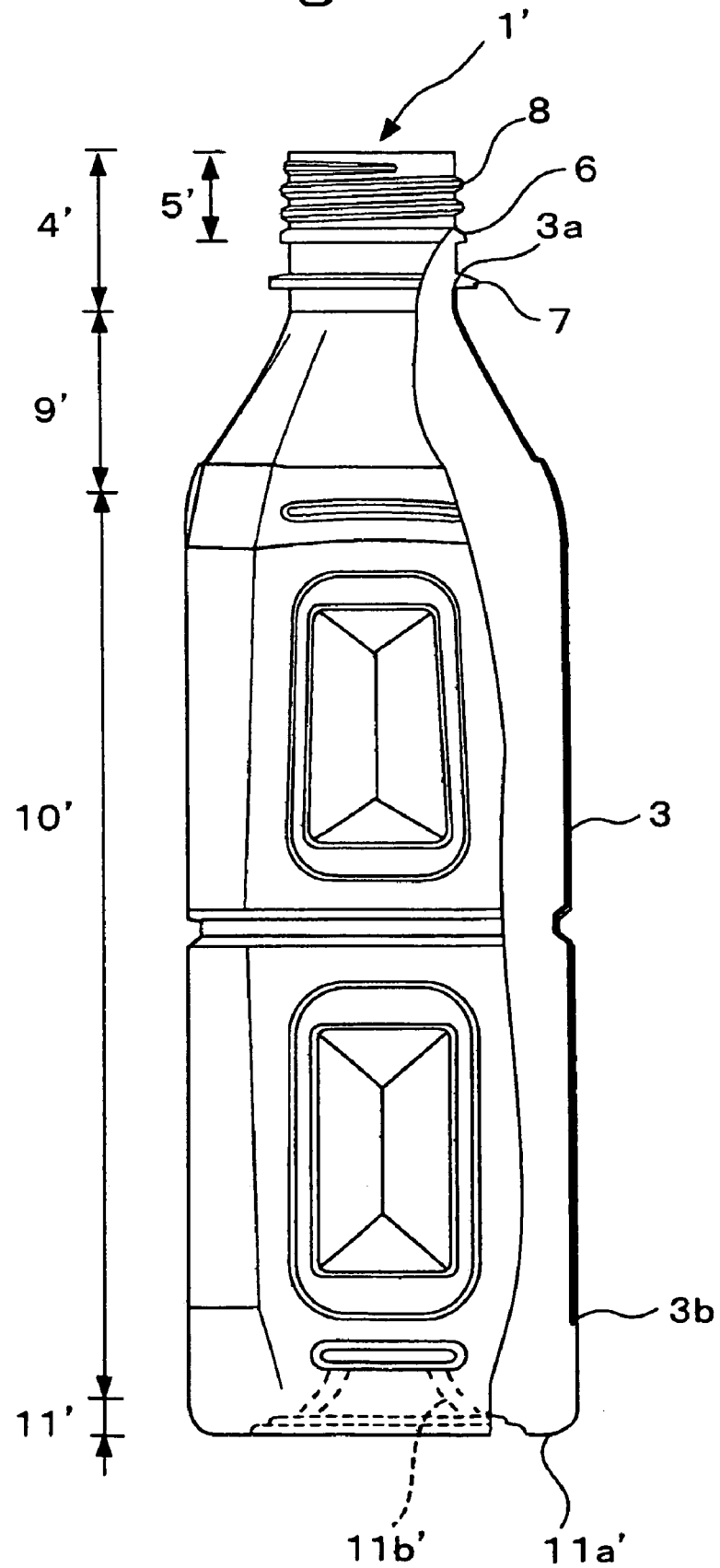
FIG. 3 is a front view of the bottle in one embodiment of this invention, which has been molded from the preform of FIG. 1.

As shown in FIG. 3, the trailing edge 3b of the gas barrier layer 3 does not reach the bottom 11' of the bottle 1' when the preform 1 has been biaxially drawn and blow-molded into the bottle 1'. Indeed, as shown in FIG. 3, the trailing edge 3b does not reach any curved portion of the bottom 11' of the bottle 1'. The bottom 11' of the bottle 1' is defined as the portion comprising the ground contact portion 11a' and the concave portion 11b', including the curved area of the ground contact portion 11a'.

Figure 2:
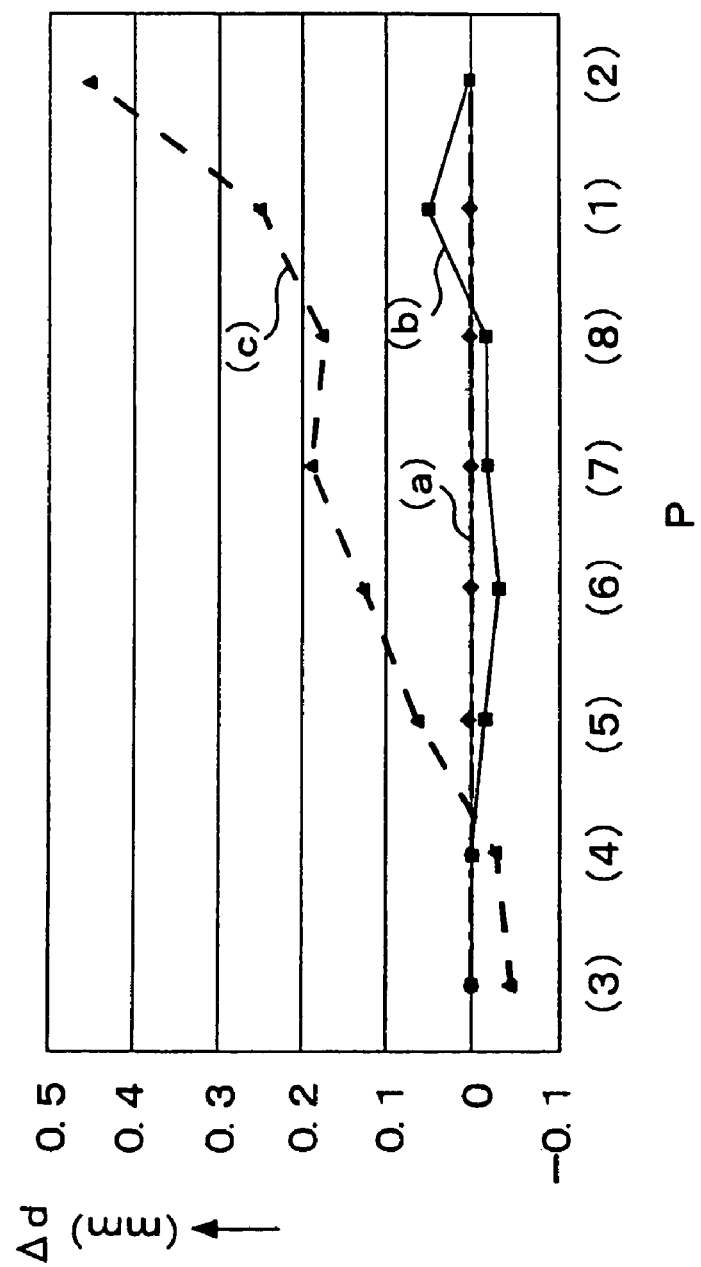
FIG. 2 is a graphic diagram showing the changes in the dimensions measured after the whitening treatment in various portions of the neck of (a) the preform made of the PET resin alone, (b) the preform shown in the embodiment of this invention, and (c) the preform in the comparative example.

The above-described preform 1 was molded by the co-injection molding method, and its neck 4 was treated for whitening. After the treatment, the preforms thus obtained were put to a test for the dimensional changes in various portions of the neck 4. FIG. 2 shows the results.

FIG. 2 shows the dimensional changes in various portions of the neck, which have been measured after the whitening treatment, in which the measurements were made by using (a) the preform molded by the PET resin alone (control), (b) the preform of this invention, in which the leading edge 3a has not reached a half height of the stop ring 6 (this invention), and (c) the preform in which the leading edge has reached a position higher than the stop ring 6 (a comparative example). In FIG. 2, vertical axis indicates the dimensional difference, Δd, for the preform (b) and the preform (c), as compared with the preform (a); and the horizontal axis indicates the points of measurements, P, for each preform.

As shown in FIG. 2, the preform (b) showed little change in the outer diameter (5) of the screw thread 8 that belonged to the functional portion 5 of the neck 4, the outer diameter (6) of the stop ring 6, the outer diameter (7) in the lower part of the stop ring 6, and the outer diameter (8) of the neck ring 7, as compared with the preform (a). Thus, the test proved that after the whitening treatment, the neck 4 had been molded in almost the same dimensions as designed.

The preform (b) also showed little change in (1) the height of the functional portion 5 ranging from the stop ring 6 to the bottle mouth 4a and (2) the neck height ranging from the neck ring 7 to the bottle mouth 4a, as compared with the preform (a) that was molded with the PET resin alone, thus proving that there is no change in the extent of shrinkage for the neck 4.

On the other hand, the neck of the preform (c) had the leading edge at a position higher than the stop ring 6 and showed larger measurements than in the neck of preform (a) made of PET alone, especially in such items as the outer diameter (5) of the screw thread 8 in the functional portion 5, the outer diameter (6) of the stop ring 6, the outer diameter (7) in the lower part of the stop ring 6, and the outer diameter (8) of the neck ring 7, after the whitening treatment. Thus, it can be confirmed that after the whitening treatment, the neck 4 becomes less shrinkable and has larger dimensions than the set values and is unable to have the right dimensions as designed, due to the difference in the degrees of shrinkage between the PET resin and the gas barrier layer 3, which has the leading edge 3a at a position higher than the stop ring 6.

The neck of the preform (c), with the leading edge 3a extending to a position higher than the stop ring 6, has fairly larger dimensions than the neck of the preform (a) in such items as (1) the height of the functional portion 5 ranging from the stop ring 6 to the bottle mouth 4a and (2) the neck height ranging from the neck ring 7 to the bottle mouth 4a. Since the leading edge 3a of the gas barrier layer 3 has reached the functional portion 5 of the neck 4, it can be clearly confirmed that the whitening treatment makes the neck less shrinkable.

From the results shown in FIG. 2 it could have been confirmed that after the whitening treatment, the neck 4 can be molded precisely in the same dimensions as designed for the preform 1 in which the leading edge 3a of the gas barrier layer 3 has been set at a half height of the neck ring 7 so that even the most advanced front of the leading edge 3a would not reach a half height of the stop ring 6, which is a part of the functional portion 5 of the neck 4.

The above-described preform 1 was biaxially drawn and blow-molded into the bottle 1'. The bottle was filled with a liquid and was put to a test in which a vertical load was applied to the bottle. A gas barrier layer 3 with a content of 5.1 wt. % and a thickness of 35 μm was used, and the trailing edge 3b of this gas barrier layer was set in the lower portion of the body 10. The preform 1 having such a gas barrier layer 3 was biaxially drawn and blow-molded into a 500-ml bottle 1' for the test.

The test with the bottle 1' confirmed that the gas barrier layer 3 and the PET resin layers 2 did not break away from each other up to a force of 661.5N at which the bottle 1' buckled.

From the results of this test it has been confirmed that the PET resin layers 2 and the gas barrier layer 3 are not broken away from each other and that there is neither damaged transparency nor poor outer appearance, which would occur if the gas barrier layer 3 were broken away from the PET resin layers 2. Actually such separation does not occur unless an outside shock, if any, caused by a vertical load, such the fall of the bottle 1', is strong enough to buckle the bottle 1'. This is because there is no gas barrier layer 3 in the bottom 11' of the bottle 1', which is molded from the preform 1 that has been molded by setting the trailing edge 3b of the gas barrier layer 3 at the position in the lower end of the body 10 where the trailing edge 3b does not reach the bottom 11'.

Preferred gas barrier materials include gas barrier resins, such as a polyamide containing m-xylylene diamine (known under the trade name of MXD-6), which is used in the embodiment of this invention, and a copolymer of ethylene vinyl alcohol (EVOH); and the mixtures of these gas barrier resins with oxygen-absorbing resins that are commonly used in the form of inorganic or organic metal complexes containing transition metal catalysts (e.g., Co, Fe, Mn, Ni, and Ti) in the matrix of aliphatic and aromatic nylons.

The embodiment of this invention shows two types of resins in three layers comprising PET/Gas barrier/PET. It should be understood that this invention is not limited to this embodiment, but it is also possible to use a multilayer structure of two or three types of resins in five layers comprising, for instance, PET/Gas barrier/PET (including recycled material)/Gas barrier/PET.

INDUSTRIAL APPLICABILITY

This invention comprising the above-described configuration has the following effects:

When the bottle according to the invention of Claim 1 is molded, the leading edge of the gas barrier layer has been set at the position of the neck where the most advanced front of the leading edge neither reaches a half height of the stop ring that is a part of the functional portion of the neck nor extends to the functional portion of the neck, or has been set at a half height of the neck ring. This set position of the leading edge is not affected by the displacement of the leading edge, which is sometimes observed inside the PET resin layers at the preform-molding stage. After the whitening treatment of the neck, the bottle does not have to face the problem of the neck that shrinks less and increases in dimensions, because the problem is caused simply by the difference in the degrees of shrinkage between the PET resin and the gas barrier material. Instead, the neck can be molded in the right dimensions as designed.

In the invention of Claim 2, the functional portion of the neck is treated for whitening without being affected altogether by the gas barrier layer. Thus, after the whitening treatment, the functional portion can be given the right dimensions as specified.

In the invention of Claim 3, it is easy to set the position of the leading edge of the gas barrier layer, and the bottle can be molded safely while avoiding the impact of the gas barrier layer on the neck.

In the invention of Claim 4, the trailing edge of the gas barrier layer is set at the position in the lower portion of the body where the trailing edge does not reach the bottom. Therefore, no gas barrier layer exists in the bottom of the biaxially drawn, blow-molded bottle. Even if the bottle experiences the shock of a vertical load, such as the fall of the bottle, the bottle thus molded is free from any damaged transparency and poor outer appearance that may be caused by the separation of the gas barrier layer from the PET resin layers at the bottom of the bottle.

In the invention of Claim 5, the leading edge of the gas barrier layer is set at a half height of the stop ring, which is a part of the functional portion of the neck, or at a position of the neck where the most advanced front of the leading edge does not reach the functional portion of the neck. In addition, the trailing edge of the gas barrier layer is set at the position in the lower portion of the body. These settings make it possible to mold the neck in the right dimensions as designed and to provide the biaxially drawn, blow-molded bottle while causing no separation between the gas barrier layer and the PET resin layers and avoiding damaged transparency and poor outer appearance in the bottom of the bottle even if there is a vertical load or the fall of the bottle.

When the preform according to the invention of Claim 6 is molded, the leading edge of the gas barrier layer is positioned at a half height of the neck ring so that the most advanced front of the leading edge neither reaches a half height of the stop ring nor extends to the functional portion of the neck. Because of this setting it is possible, after the whitening treatment, to mold the preform of a laminated structure that can be molded into the bottle with its neck having the right dimensions as designed.

When the preform according to the invention of Claim 7 is molded, the trailing edge of the gas barrier layer is set at the position where the trailing edge does not reach the bottom. Therefore, it is possible to mold the preform that in turn can be molded into the biaxially drawn, blow-molded bottle without causing any damaged transparency and poor outer appearance even if the bottle experiences the shock of a vertical load, such as the fall of the bottle.

The invention claimed is:
1. A biaxially drawn, blow-molded bottle comprising:
a neck having an upper portion and a lower end;
a body having a bottom that includes a curved area;
at least a gas barrier layer laminated inside layers predominantly made of polyethylene terephthalate;

a functional portion having a screw thread raised spirally in the upper portion of the neck and also having a stop ring disposed under the screw thread; and a neck ring disposed at the lower end of the neck, the neck ring disposed below the screw thread and the stop ring, wherein a leading edge of the gas barrier layer is disposed at a position of the neck where a most advanced front of the leading edge does not reach a half height of the stop ring, wherein a trailing edge of the gas barrier layer is disposed in a lower portion of the body where the trailing edge does not reach any curved area of the bottom of the body of the bottle, and wherein the neck is treated for thermal crystallization.

2. The biaxially drawn, blow-molded bottle according to claim 1, wherein the leading edge of the gas barrier layer is disposed at a position of the neck where the most advanced front of the leading edge does not reach the functional portion of the neck.

3. The biaxially drawn, blow-molded bottle according to claim 1, wherein the leading edge of the gas barrier layer is disposed at a position within a range of ±7 mm from a half height of the neck ring.

4. A preform of a biaxially drawn, blow-molded bottle comprising:

a neck having an upper portion and a lower end;

a body having a bottom that includes a curved area;

at least a gas barrier layer laminated inside layers predominantly made of a polyethylene terephthalate resin;

a functional portion having a screw thread raised spirally in the upper portion of the neck and also having a stop ring disposed under the screw thread; and a neck ring disposed at the lower end of the neck, the neck ring disposed below the screw thread and the stop ring, wherein a leading edge of the gas barrier layer is positioned at a half height of the neck ring so that a most advanced front of the leading edge neither reaches a half height of the stop ring nor extends to the functional portion, wherein the trailing edge of the gas barrier layer is disposed in a lower portion of the body so that the trailing edge does not reach any curved area of the bottom of the body of the bottle, and wherein the neck is treated for thermal crystallization.

* * * * *